(12) United States Patent
Trudeau et al.

(10) Patent No.: US 10,291,073 B2
(45) Date of Patent: May 14, 2019

(54) DEVICES AND METHODS FOR CONTROLLING TRANSMITTER POWER SUPPLY BASED ON WIRELESS RECEIVER REQUEST

(71) Applicant: QUALCOMM Incorporated, San Diego, CA (US)

(72) Inventors: Colby Trudeau, Carlsbad, CA (US); Scott Walter, San Diego, CA (US); Zhen Ning Low, San Diego, CA (US); Joseph Najib Maalouf, San Diego, CA (US); Curtis Gong, San Diego, CA (US); Sumukh Ashok Shevde, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 15/181,245

(22) Filed: Jun. 13, 2016

(65) Prior Publication Data

US 2017/0358953 A1 Dec. 14, 2017

(51) Int. Cl.
*H02J 50/12* (2016.01)
*H02J 7/04* (2006.01)
*H02J 7/02* (2016.01)
*H02J 7/00* (2006.01)
*H04B 5/00* (2006.01)
(Continued)

(52) U.S. Cl.
CPC ............ *H02J 50/12* (2016.02); *H02J 7/0029* (2013.01); *H02J 7/025* (2013.01); *H02J 7/04* (2013.01); *H02J 50/80* (2016.02); *H04B 5/0037* (2013.01); *H02J 50/40* (2016.02)

(58) Field of Classification Search
None
See application file for complete search history.

(56) References Cited

U.S. PATENT DOCUMENTS 7,155,242 B1 12/2006 MacKenzie et al.
8,823,319 B2 9/2014 Von Novak, III et al.
8,928,284 B2 1/2015 Carobolante
(Continued)

FOREIGN PATENT DOCUMENTS

WO WO-2015012509 A1 1/2015

OTHER PUBLICATIONS

International Search Report and Written Opinion—PCT/US2017/033151—ISA/EPO—dated Aug. 1, 2017.

*Primary Examiner* — Jared Fureman
*Assistant Examiner* — Aqeel H Bukhari
(74) *Attorney, Agent, or Firm* — Colby Nipper; Qualcomm Incorporated

(57) ABSTRACT

Devices and methods for controlling a power supply of a wireless power transmitter based on the request of a wireless power receiver are disclosed. One embodiment provides a wireless power receiver. The wireless power receiver includes a power receiver circuit configured to receive power from a wireless power transmitter at a level sufficient to power or charge a load. The wireless power receiver also includes a processor circuit configured to adjust a level of the received power being provided to the load based on a change in a level of received power to be requested to the wireless power transmitter. The processor circuit is further configured send to the wireless power transmitter the request to change the level of the received power to a first different level.

24 Claims, 7 Drawing Sheets

(51) Int. Cl.
*H02J 50/80* (2016.01)
*H02J 50/40* (2016.01)

(56) References Cited

U.S. PATENT DOCUMENTS

| | | | |
|---|---|---|---|
| 2013/0285620 A1* | 10/2013 | Yamamoto | H02J 7/0029 |
| | | | 320/155 |
| 2015/0022011 A1* | 1/2015 | Kim | H04B 5/0037 |
| | | | 307/104 |
| 2015/0102687 A1* | 4/2015 | Miyamoto | H02J 5/005 |
| | | | 307/104 |
| 2015/0318707 A1* | 11/2015 | Huynh | H02J 50/12 |
| | | | 307/104 |
| 2016/0006289 A1 | 1/2016 | Sever et al. | |

* cited by examiner

US 10,291,073 B2

DEVICES AND METHODS FOR CONTROLLING TRANSMITTER POWER SUPPLY BASED ON WIRELESS RECEIVER REQUEST

This application is generally related to wireless power charging of chargeable devices. More particularly, the application relates to devices and methods for controlling a power supply of a wireless power transmitter based on the request of a wireless power receiver.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

A wireless power receiver is disclosed. The wireless power receiver comprises a a power receiver circuit configured to receive power from a wireless power transmitter at a level sufficient to power or charge a load. The wireless power receiver also comprises a processor circuit configured to adjust a level of the received power being provided to the load based on a change in a level of received power to be requested to the wireless power transmitter. The processor circuit is further configured to send to the wireless power transmitter the request to change the level of the received power to a first different level.

A method of receiving wireless power is disclosed. The method comprises wirelessly receiving power from a transmitter at a level sufficient to power or charge a load. The method also comprises providing the received power to the load and comparing the level of the received power with a threshold power value. The method further comprises adjusting the level of the power being provided to the load based at least in part on the comparison; and sending to the transmitter a request to change the level of the received power to a different power level.

A system for receiving wireless power is disclosed. The system comprises means for wirelessly receiving power from a transmitter at a level sufficient to power or charge a load. The system also comprises means for providing the received power to the load and means for comparing the level of the received power with a threshold power value. The system further comprises means for adjusting the level of the power being provided to the load based at least in part on the comparison and means for sending to the transmitter a request to change the level of the received power to a different power level.

Other aspects of the present disclosure provide for an apparatus according to any of the embodiments described herein or in the figures. Other aspects of the present disclosure provide for a method according to any of the embodiments described herein or in the figures.

Figure 1:
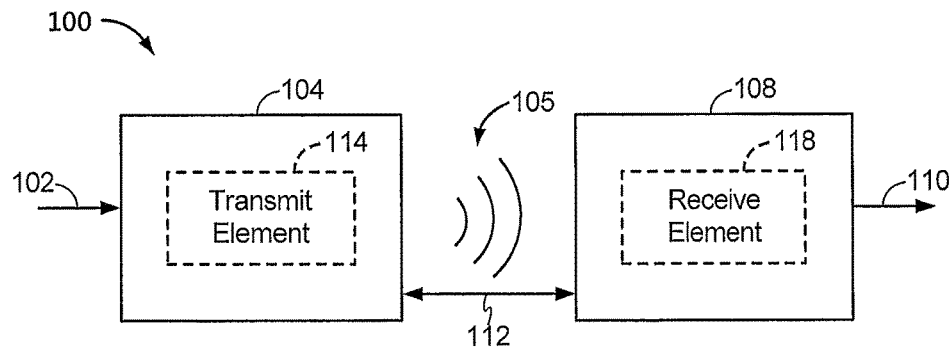
FIG. 1 is a functional block diagram of an exemplary wireless power transfer system, in accordance with exemplary embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of an exemplary wireless power transfer system 100, in accordance with exemplary embodiments of the application. Input power 102 may be provided to a transmitter circuit 104 from a power supply (not shown in this figure) to generate a wireless (e.g., magnetic or electromagnetic) field 105 for performing energy transfer. A receiver circuit 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element circuit 114 for transmitting/coupling energy to the receiver 108. The receiver 108 may include a power receiving element circuit 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Aspects described herein relate to wireless power transfer systems. In some embodiments, a wireless power transmitter (e.g., transmitter 104), coupled to a power supply (not shown), may transmit wireless power to a wireless power receiver (e.g., receiver 108). In some aspects, the power supply may be a standard universal serial bus (USB) power supply or a non-standard non-USB connector for a higher DC voltage input. This higher voltage may then be bucked down (reduced) to an optimum voltage that enables efficient power delivery based on charging current. Thus, some wireless power transmitters rely on a higher voltage DC power supply and buck circuitry. The additional buck (power reduction) may result in a bigger board area, higher costs and a lower system efficiency. Embodiments described herein relate to controlling a power supply of a wireless power transmitter based on the request of a wireless power receiver without the need of a power reduction circuit.

Figure 2:
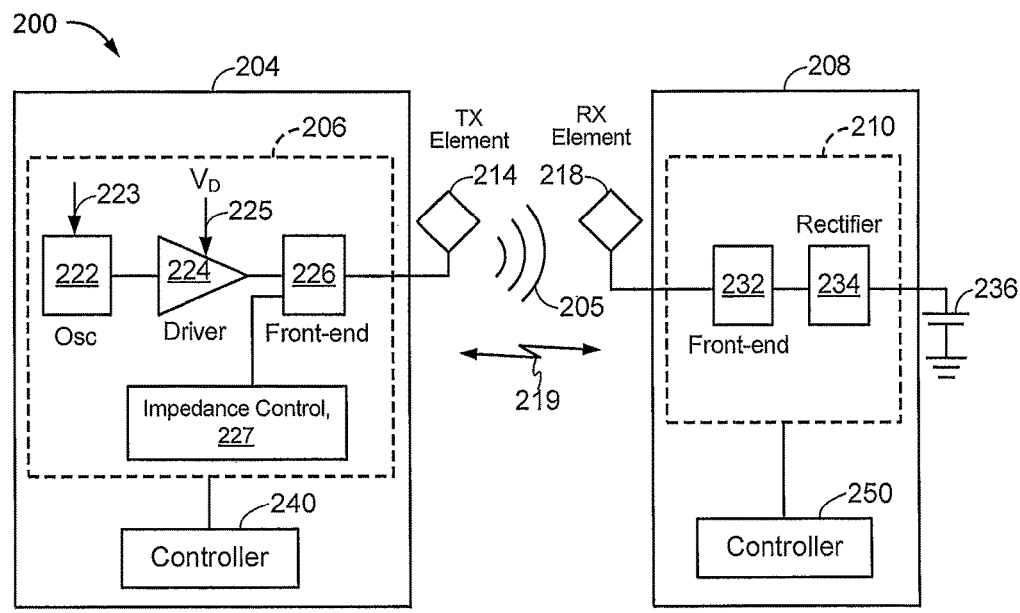
FIG. 2 is a functional block diagram of exemplary components that may be used in the wireless power transfer system of FIG. 1, in accordance with various exemplary embodiments.

FIG. 2 is a functional block diagram of a wireless power transfer system 200, in accordance with another illustrative embodiment. The system 200 may be a wireless power transfer system of similar operation and functionality as the system 100 of FIG. 1. However, the system 200 provides additional details regarding the components of the wireless power transfer system 200 than FIG. 1. The system 200 may include a transmitter circuit 204 and a receiver circuit 208. The transmitter 204 (also referred to herein as power transmitting unit, PTU) may include transmit circuitry 206 that may include an oscillator circuit 222, a driver circuit 224, a front-end circuit 226, and an impedance control module circuit 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal ($V_D$) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module circuit 227 may control the front-end circuit 226.

The transmitter 204 may further include a controller circuit 240 operably coupled to the transmit circuitry 206 configured to control one or aspects of the transmit circuitry 206 or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. The receiver 208 may directly couple to the wireless field 205 and may generate an output power for storing or consumption by a battery (or load) 236 coupled to the output or receive circuitry 210.

The receiver 208 may further include a controller circuit 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver. In some aspects, the wireless power transfer system 200 represents a more detailed view of the wireless power transfer system 100.

Figure 3:
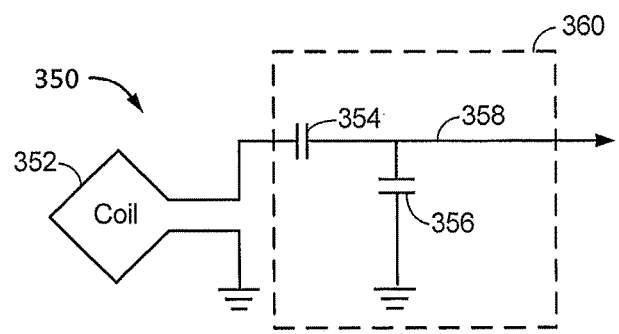
FIG. 3 is a schematic diagram of a portion of transmit circuitry or receive circuitry of FIG. 2, in accordance with exemplary embodiments.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element circuit 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Embodiments and descriptions provided herein may be applied to resonant and non-resonant implementations (e.g., resonant and non-resonant circuits for power transmitting or receiving elements and resonant and non-resonant systems). In some aspects, the transmit or receive circuitry 350 may facilitate wireless power reception or transmission at a frequency that is more efficient than wireless power reception or transmission using transmit or receive circuitry without the tuning circuit 360.

Figure 4:
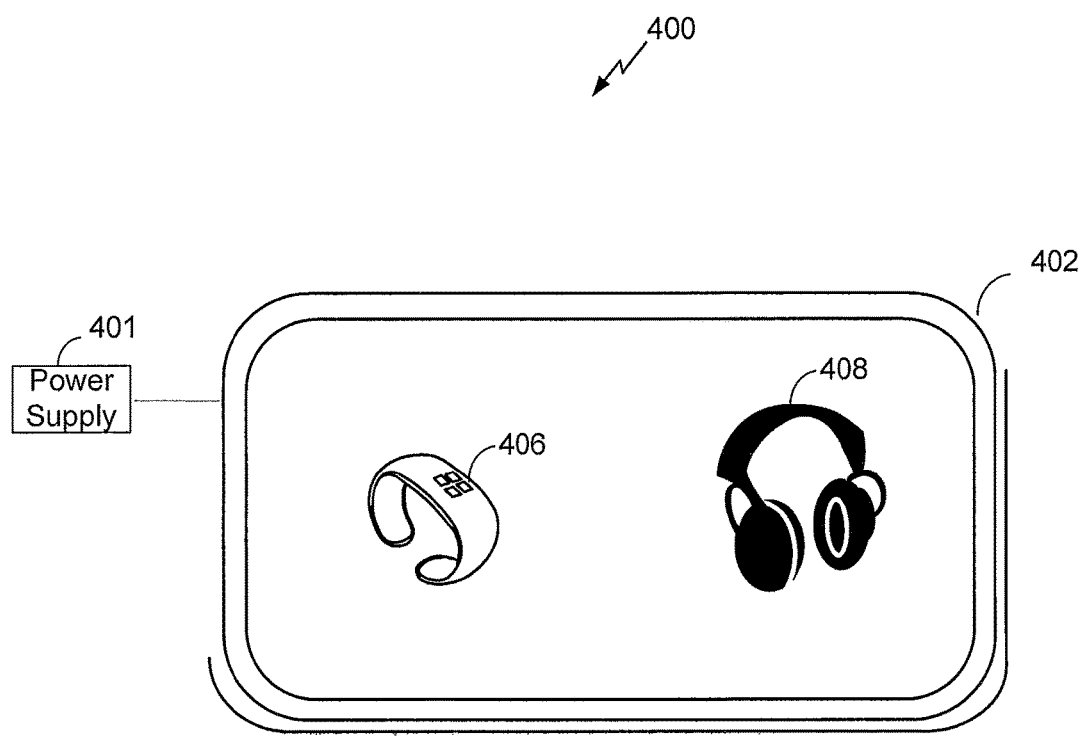
FIG. 4 is a diagram of an exemplary wireless power transfer system, in accordance with exemplary embodiments.

FIG. 4 is a diagram of another exemplary wireless power transfer system 400, in accordance with another illustrative embodiment. The wireless power transfer system 400 may comprise a power transmitting unit (PTU) 402 coupled to a power supply 401 and power receiving units (PRUs) 406 and 408. In some embodiments, as shown in FIG. 4, the PTU 402 may comprise a charging pad, and the PRUs 406 and 408 may comprise a smartwatch 406 and a headphone 408, respectively. However, the PTU 402 may comprise another power transmitting device that can receive power from the power supply 401, wirelessly transfer the received power to the PRUs 406 and 408, and communicate data with the power supply 401 and the PRUs 406 and 408. Furthermore, the PRUs 406 and 408 may comprise other power receiving devices, which can wirelessly receive power from and communicate data with the PTU 402, such as the examples of the PRUs 406 and 408 described above.

In some embodiments, the power supply 401 may comprise a standard USB power supply, a non-standard non-USB power supply, a wall outlet, a battery, solar power, or other power supply. The standard USB power supply may include, for example, a standard 2.5 W or 5 W USB power supply. The power supply 401 may further comprise a single level power supply such as a Qualcomm-licensed quick charge (QC) 1.0 power supply, a multistage fixed power supply such as a QC 2.0 power supply and a multistage variable power supply such as a QC 3.0 power supply. The QC 1.0 power supply may provide power having a single power level up to 10 W (e.g., 5V×2 A). The QC 2.0 power supply may provide power having multiple fixed voltages (e.g. 5V, 9V, 12V and 20V) and current up to 3 A (i.e., power up to 60 W). The QC 3.0 power supply may provide power having variable voltage steps, for example, from 5V to 20V with incremental voltage changes such as 200 mV and current up to 3 A (i.e., power up to 60 W). Although the above QC 2.0 and 3.0 power supplies have the minimum voltage level of 5V and the maximum voltage level of 20V, the minimum voltage level may be less or greater than 5V and the maximum voltage level may be greater or less than 20V. In this disclosure, power, whose unit is watt (W), may also mean voltage and/or current.

The PTU 402 may be similar to and may comprise similar components as the transmitter 104 and/or 204 of FIGS. 1 and 2. For example, PTU 402 may comprise one or more of the power transmitting elements 114, 214, and 352 of FIGS. 1-3 and the transmit circuitry 206 of FIG. 2. Additionally, the PRUs 406 and 408 may be similar to and may comprise similar components as the receiver 108 and/or 208 of FIGS. 1 and 2. For example, PRUs 406 and 408 may comprise one or more of the power receiving elements 118, 218, and 352 of FIGS. 1-3 and the receive circuitry 210 of FIG. 2.

As shown in FIG. 4, the PRUs 406 and 408 may be placed on a surface of or close to the PTU 402 for charging. While two PRUs 406 and 408 are shown, the wireless power transfer system 400 may comprise a single PTU 402 and a single PRU (e.g., PRU 406). In some aspects, a PTU 402 designed to operate with a specific PRU (e.g., PRU 406) or with a type or brand of the PRU 406 may be referred to as a "dedicated PTU 402." Likewise a PRU 406 designed to operate with a specific PTU (e.g., PTU 402) or with a type or brand of the PTU 402 may be referred to as a "dedicated PRU 406." The use of a dedicated PTU 402 and/or a dedicated PRU 406 may have the benefit of the PTU 402 and/or PRU 406 being capable of identifying certain power transfer parameters or characteristics of the respective PRU 406 and/or PTU 402. Such power transfer parameters or characteristics may be communicated between the PTU 402 and PRU 406 or may be stored in a memory of the respective devices.

In other embodiments, more than two PRUs may be placed on the surface of or close to the PTU 402 for charging. In the embodiments of a single or dedicated PTU 402 and a single or dedicated PRU 406, the PTU 402 and PRU 406 may participate in a pairing process where certain power transfer parameters may be exchanged.

In some embodiments, the PTU 402 may detect a type of the power supply 401 connected thereto, and communicate the detected type information to the PRUs 406 and 408. The PRUs 406 and 408 may transmit a request to change a power level of the power supply 401 to the PTU 402. The PTU 402 and PRUs 406 and 408 may communicate the above described information via a separate communication channel (e.g., communication channel 219 of FIG. 2) or via in-band signaling using characteristics of the wireless field 205 as discussed with respect to FIG. 2. The PRUs 406 and 408 may include, but are not limited to, a TV, a laptop, a tablet, a mobile phone, a smartphone, a personal digital assistant (PDA), a personal media player (PMP), a game console, a digital camera, a computer peripheral device, a communication device (e.g., Bluetooth or Zigbee devices), a hearing aid, a wearable device, or any other device that can wirelessly receive power from the PTU 402.

Figure 5:
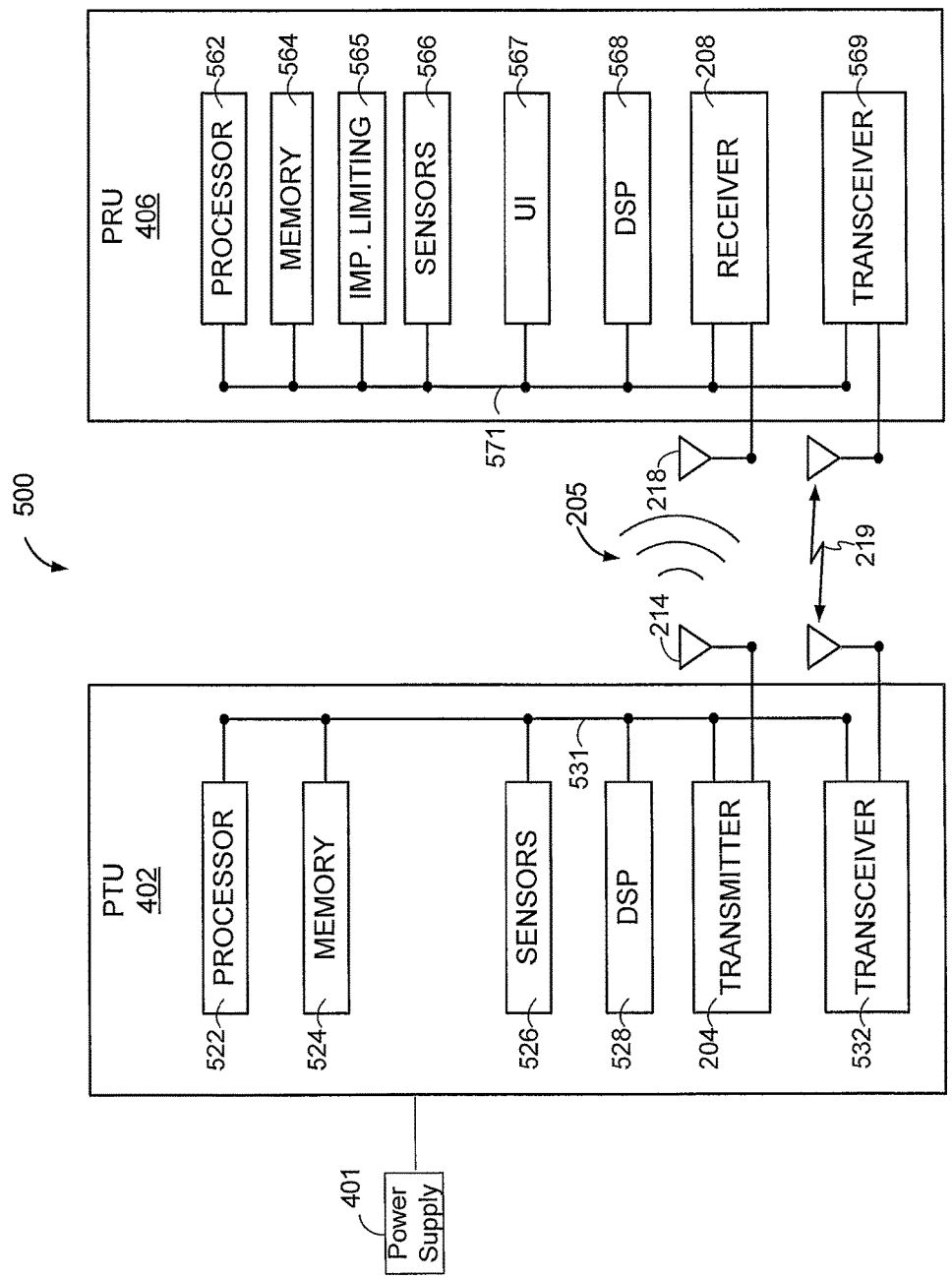
FIG. 5 is a functional block diagram of a wireless power transfer system, in accordance with one implementation as used in the system of FIG. 4.

FIG. 5 shows an exemplary functional block diagram of a wireless power transfer system 500. The PTU 402 may transfer wireless power to the PRU 406 via the wireless field 205 in accordance with the descriptions of FIGS. 1-4 described above. As shown, the PTU 402 is coupled to the power supply 401 and may utilize the processes and methods disclosed herein.

The PTU 402 may comprise a hardware processor circuit 522 configured to control the operation of the PTU 402. The processor 522 may also be referred to as a central processing unit (CPU). The processor 522 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include physical machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The PTU 402 may further comprise a hardware memory circuit 524, which may include both read-only memory (ROM) and random access memory (RAM), may provide instructions and data to the processor 522. The memory 524 may be operably coupled to the processor circuit 522. A portion of the memory 524 may also include non-volatile random access memory (NVRAM). The processor 522 typically performs logical and arithmetic operations based on program instructions stored within the memory 524. The instructions in the memory 524 may be executable to implement the methods described herein.

The PTU 402 may further comprise one or more hardware sensor circuits 526 operably coupled to the processor 522 and/or the memory 524 via a bus 531. The bus 531 may include a data bus, for example, as well as a power bus, a control signal bus, and a status signal bus. Those of skill in the art will appreciate that the components of the PTU 402 may be coupled together or accept or provide inputs to each other using some other mechanism.

The sensors 526 may include, but are not limited to, power sensors, temperature sensors, impedance sensors, or other types of sensors. The sensors 526 may be configured to detect a connection, between the power supply 401 and the PTU 402, and/or an amount of power supplied by the power supply 401. The sensors 526 may communicate the detected information to other PTU components such as the processor 522 via the bus 531. The sensors 526 may further detect a type of the power supply 401. The type of the power supply 401 may include, but is not limited to, a standard USB power supply, a non-standard non-USB power supply, a wall outlet, a battery, solar power, a multistage fixed power supply (e.g., a QC 2.0 power supply), a multistage variable power supply (e.g., a QC 3.0 power supply), and a single level power supply (e.g., a QC 1.0 power supply). The detected connection between the power supply 401 and the PTU 402, the detected type of the power supply 401, and/or the amount of power supplied may be communicated to the processor 522, the transceiver 532, or other components of the PTU 402. The processor 522 may control the transceiver 532 to transmit at least the power supply type information to the PRU 406 via the communication channel 219.

The PTU 402 may also include a hardware digital signal processor (DSP) circuit 528 for use in processing signals. The DSP 528 may be configured to generate a packet for transmission. In some embodiments, the DSP 528 may be configured to perform at least some functionality of the processor 522 independently from or under the control of the processor 522.

The PTU 402 may also comprise the transmitter 204 and the power transmitting element 214 of FIG. 2 for transmission of wireless power via the wireless field 205, for reception by the PRU 406 at the power receiving element 218 (see FIG. 2). For example, the transmitter 204 may transfer power received from the power supply 401 to the PRU 406 via the wireless field 205. The transmitter 204 may receive and transfer power having a first power level to the PRU 406. The transmitter 204 may subsequently receive and transfer power having a second power level, different from the first power level, to the PRU 406 under the control of the processor 522.

In some embodiments, the transceiver 532 and the transmitter 204 may share the power transmitting element 214. For example, the transceiver 532 may be configured to send data via modulation of the wireless field 205 used for transferring power. In another example, the communication channel 219 may be different from the wireless field 205, as shown in FIG. 5. In another example, the transceiver 532 and the transmitter 204 may not share the power transmitting element 214 and may each have their own antennas.

The PTU 402 may also comprise a hardware transceiver circuit 532 allowing transmission and reception of data between the PTU 402 and the PRU 406 via the communication channel 219. In some aspects, the transceiver 532 may comprise any communication element. Such data and communications may be received by a hardware transceiver circuit 569 within the PRU 406. As discussed above, the transceiver circuit 532 may send power supply type information to the PRU 406. The transceiver 532 may also receive a power level change request from the transceiver circuit 569 of the PRU 406 and communicate the received request to the processor 522 via the bus 531. In response to receiving the power level change request, the processor 522 may control or request the power supply 401 to change the present power level to a different power level.

For example, the power supply 401 may be a multistage fixed power supply such as a QC 2.0 power supply and the present power level is 5 W (e.g., 5V×1 A). In this example, the PTU 402 may receive a power level change request, from the PRU 406, indicating a specific higher power level, for example, 9 W (e.g., 9V×1 A), or merely requesting a power level increase without specifying a power level to be adjusted. In this scenario, the processor 522 may control the power supply 401 to change the present power level (5 W) to a higher power level such as 9 W (9V×1 A). As another example, the power supply 401 may be a QC 2.0 power supply and the present power level is 60 W (e.g., 20V×3 A). In this example, the PTU 402 may receive a power level change request, from the PRU 406, indicating a specific lower power level, for example, 36 W (e.g., 12V×3 A), or merely requesting a power level decrease without specifying a power level to be adjusted. In this scenario, the processor 522 may control the power supply 401 to change the present power level (60 W) to a lower power level such as 36 W (12V×3 A).

As another example, the power supply 401 may be a multistage variable power supply such as a QC 3.0 power supply and the present power level is 5 W (5V×1 A). In this example, the PTU 402 may receive a power level change request, from the PRU 406, indicating a specific higher power level, for example, 5.2 W (5.2V×1 A), or merely requesting a power level increase without specifying a power level to be adjusted. In this scenario, the processor 522 may control the power supply 401 to change the present power level (5 W) to a higher power level such as 5.2 W (5.2V×1 A).

As another example, when the power supply 401 is a QC 3.0 power supply and the present power level is 18 W (e.g., 9V×2 A), the PTU 402 may receive a power level change request, from the PRU 406, indicating a specific lower power level, for example, 17.6 W (e.g., 8.8V×2 A), or merely requesting a power level decrease without specifying a power level to be adjusted. In this example, the processor 522 may control the power supply 401 to change the present power level (18 W) to a lower power level such as 17.6 W (8.8V×2 A). Although the processor 522 controls the power supply 401 to increase or decrease the voltage level by 200 mV, this is a merely example, the incremental value may be less or greater than 200 mV depending on the embodiment (e.g., 100 mV or 300 mV, etc.)

In the above examples, the power supply 401 provides power having an adjusted power level to the PTU 402. The processor 522 may then control the transmitter 204 to transmit the adjusted power to the PRU 406 via the wireless field 205. When the PTU 402 receives another request to change a power level from the PRU 406, the PTU 402 may repeat the above described operation.

In the above examples, the present power levels (5 W, 9 W, 18 W, 36 W, 60 W, etc.) are merely examples and can have different power levels for the same voltages (5V, 9V, 12V, 30V, etc.). For example, the present power level for a voltage of 5V can be 7.5 W (1.5 A), 10 W (2 A) or another power level other than 5 W. As another example, the present power level for a voltage of 9V can be 9 W (1 A), 13.5 W (1.5 A) or another power level other than 18 W. As another example, the present power level for a voltage of 12V can be 12 W (1 A), 18 W (1.5 A), 24 W (2 A) or another power level other than 36 W. Furthermore, the present power level for a voltage of 20V can be 20 W (1 A), 30 W (1.5 A), 40 W (2 A), 50 W (2.5 A) or another power level other than 60 W. Furthermore, the above described present power levels may mean available power to be output. Thus, although the power supply 401 may output such power at a given time point, but may not constantly output such power so that the output power levels may vary.

In some embodiments, instead of adjusting a power level, only the corresponding voltage may be adjusted. For example, in response to a request for a power level change (or a voltage level change) received from the PRU 406, the processor 522 may control the power supply 401 to change a present voltage level (e.g., 9V) to different voltage levels such as 5V or 12V. The processor 522 may then control the transmitter 204 to transmit the adjusted voltage to the PRU 406 via the wireless field 205. When the PTU 402 receives another request to change a voltage level from the PRU 406, the PTU 402 may repeat the above described operation.

A non-limiting benefit of the wireless power transfer system 500 is that the PTU 402 may adjust the power level of the power supply 401 based on a power level change request received from the PRU 406. This configuration would eliminate the need of a buck-down or power reduction circuit in the PTU 402 and/or the power supply 401, reducing costs and increasing system efficiency. Furthermore, as a higher voltage power supply can be used, the solution will enable a stronger field than a standard USB power supply, allowing the PRU 406 to draw more power and charge quicker. The stronger field will also allow the PTU 402 to charge the PRU 406 in a poor coupling scenario.

The PRU 406 may comprise a hardware processor circuit 562, one or more hardware sensor circuits 566, a hardware DSP circuit 568 and the hardware transceiver circuit 569 similar to the corresponding hardware components of the PTU 402. The PRU 406 may further comprise a hardware memory circuit 564 similar to the memory 524, described above. The PRU 406 may also comprise the receiver 208 configured to receive wireless power from the PTU 402 via the wireless field 205. The receiver 208 may be configured to power or charge a load such as the battery 236 or other PRU system components using the received power. The receiver 208 may be operably connected to the processor 562, the memory 564, the sensors 566, a user interface (UI) 567 and the DSP 568 via a bus 571, similar to the bus 531. Those of skill in the art will appreciate that the components of the PRU 406 may be coupled together or accept or provide inputs to each other using some other mechanism.

The sensors 566 may measure the level of the power received from the PTU 402. The processor 562 may determine whether the measured power level is too high or too low for a current charging rate at which the battery 236 is charged and/or for a power consumption rate of the system components. For example, the processor 562 may compare the measured power level with a threshold power value. The threshold power value may be an operation range or a power tolerance value of the rectifier 234. In some embodiments, the processor 562 may determine that the received power is too high or too low, if the measured power level is significantly greater or less (e.g., at least 20% greater or less) than the threshold power value. In other embodiments, the processor 562 may determine that the received power is too high or too low, if the difference between the measured power level and the threshold value is more than a certain power value, for example, 1 W. In other embodiments, the processor 562 may determine that the received power is too high or too low, if the measured power level is merely greater or less than the threshold power value.

The PRU 406 may comprise an impedance limiting circuit 565 operably connected to the processor 562 via the bus 571 and configured to limit an impedance (i.e., Z=V/I) of the receiver 208 to prevent a voltage collapse at the receiver 208. For example, the receiver 208 may be receiving 5 W of power (e.g., 5V×1 A) and the processor 562 may determine that it requires more current at the same 5 W power level. At a constant power, the increase in the current level reduces the voltage level and the impedance level. If the voltage level falls below a certain threshold, the receiver 208 may not be able to maintain a voltage level necessary for the generation of electromagnetic fields, leading to a voltage collapse. The impedance limiting circuit 565 may set an impedance limit or threshold such that the voltage level received does not fall below a minimum value and the current does not rise above a maximum value (e.g., $Z_{Limit}=V_{min}/I_{max}$) to avoid such a voltage collapse. For example, the impedance limiting circuit 565 may lower the impedance of the receiver 208 as the current increases in order to keep the voltage level constant. In some embodiments, the impedance limiting circuit 565 may raise the impedance of the receiver 208 as the voltage level increase in order to keep the current level constant. In other embodiments, the impedance limiting circuit 565 may also communicate with the processor 562 to adjust the voltage level and/or the current level of the receiver 208 to keep an impedance level constant.

In some embodiments, in addition to preventing voltage collapse, the impedance limiting circuit 565 may allow the receiver 208 to receive different power levels from the transmitter 204. For example, the receiver 208 may be receiving 2.5 W from the PTU 402 connected to a 2.5 W power source 401. The impedance limiting circuit 565 may set a first impedance limit for receiving power (e.g., $Z_{Limit}=1V/2.5 A$) from the PTU 402. The PTU 402 may then be connected to a 5 W power source 401 and may communicate to the PRU 406 its power supply capabilities (e.g., 5 W). In order to receive the 5 W from the PTU 402, the processor 562 may adjust the impedance limit to a second impedance limit (e.g., reduce to $Z_{Limit}=1V/5 A$) based on the increased power supply capabilities of the PTU 402.

Similarly to the transceiver 532 and the transmitter 204 of the PTU 402, the transceiver 569 and the receiver 208 may share the power receiving element 218. Furthermore, the transceiver 569 may be configured to receive data via modulation of the wireless field 205 used for transferring power. Moreover, the transceiver 569 and the receiver 208 may not share the power receiving element 218 and may each have their own antennas and the communication channel 219 is different than the wireless field 205.

In some embodiments, the PRU 406 may further comprise the user interface (UI) 567. The user interface 567 may comprise a keypad, a microphone, a speaker, a display and/or any other element or component that can convey information to a user of the PRU 406 and/or receive input from the user.

Although a number of separate components are illustrated in FIG. 5, those of skill in the art will recognize that one or more of the components may be combined or commonly implemented. For example, the processor 522 may be used to implement not only the functionality described above with respect to the processor 522, but also to implement the functionality described above with respect to the sensors 526, the DSP 528 and/or other PTU components. Likewise, the processor 562 may be used to implement not only the functionality described above with respect to the processor 562, but also to implement the functionality described above with respect to the sensors 566, the DSP 568 and/or other PRU components. Further, at least one of the components illustrated in FIG. 5 may be implemented using a plurality of separate elements.

Figure 6:
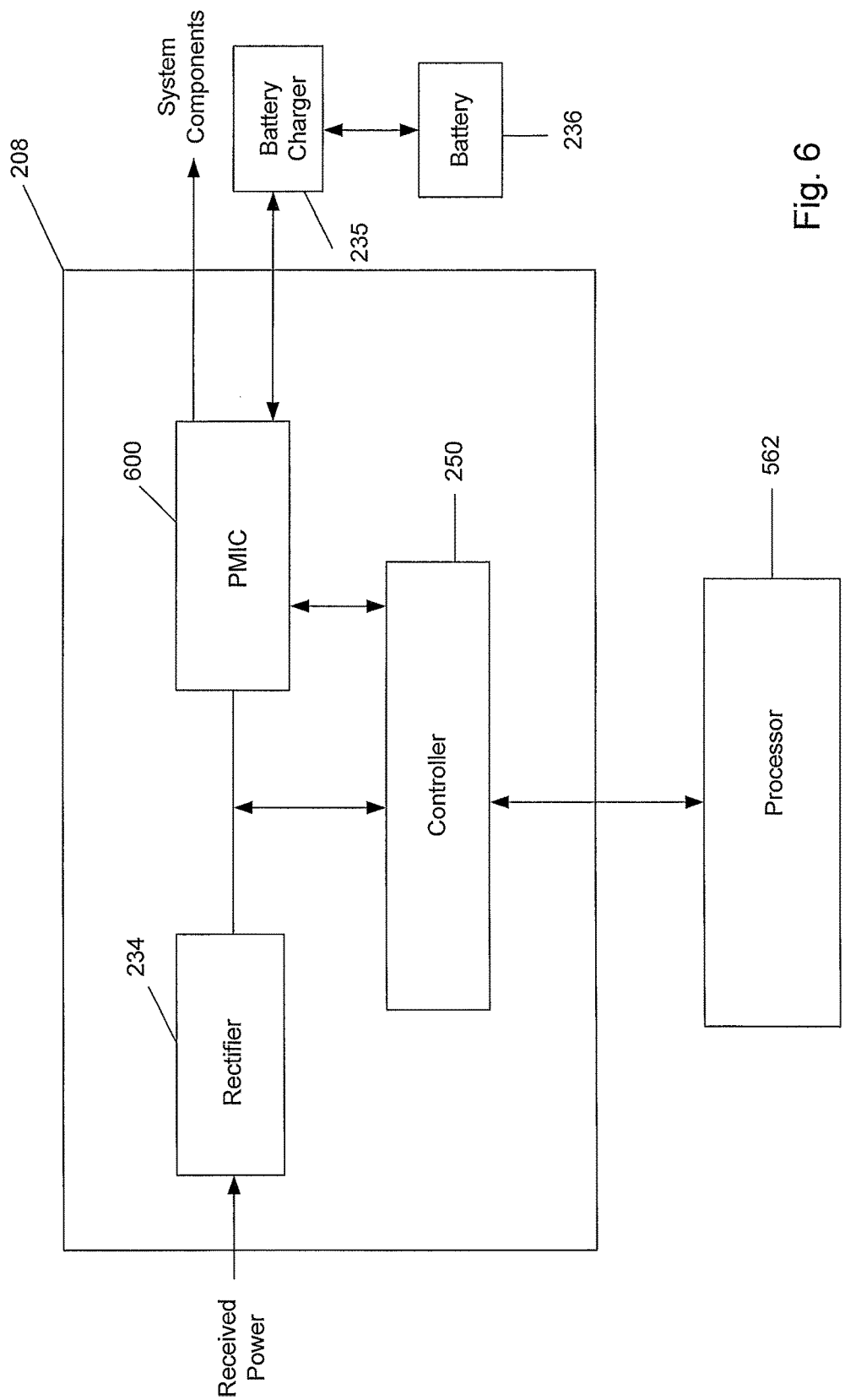
FIG. 6 is an exemplary block diagram of the receiver, in accordance with one implementation as used in the system of FIG. 5.

FIG. 6 is an exemplary block diagram of the receiver 208, in accordance with one implementation as used in the system of FIG. 5. The receive circuitry 208 may include the rectifier circuit 234, the controller circuit 250 and a power management integrated circuit (PMIC) 600. As discussed with respect to FIG. 2, the rectifier circuit 234 may generate a DC power output from an AC power input that has been received from the PTU 402. Certain elements such as the front end circuit 232 shown in FIG. 2 are omitted in FIG. 6 for simplicity.

In some embodiments (e.g., an ideal power transmission system), the PTU 402 may be designed to be a substantially ideal current source, where its output current drives a transmit coil at a level substantially proportional to a supply voltage of the PTU 402. Furthermore, a field strength generated by the PTU 402 may be proportional to the output current. In these embodiments, the rectifier voltage of the PRU 406 may be proportional to the field strength and coupling. That is, the PRU rectifier voltage may be proportional to the PTU voltage supplied by the power supply 401. In other embodiments (e.g., a practical system), there may be loss resistance in every chain and this will cause a collapse of the rectifier voltage based on a higher input current. Therefore, in the practical system, increase in the supply voltage to the PTU 402 may compensate for a worse coupling even if the PRU 406 is moved from the original position.

The PMIC 600 may receive the DC power output from the rectifier circuit 234 and appropriately allocate the received power between PRU system components and the battery 236 connected to a battery charger 235 under the control of the controller 250. The battery charger 235 may be part of, or separate from, the PMIC 600. In some embodiments, the PMIC 600 or the battery charger 235 may include a power path manager configured to provide power first to the system components, and provide any remaining power to the battery 236 via the battery charger 235. The PMIC 600 may adjust $I_{batt}$ in such a way that $I_{sys}+I_{bat}=I_{rx}$, where $I_{batt}$ is current being supplied to the battery 236, $I_{sys}$ is current being supplied to (or required by) the system components, and $I_{rx}$ is an entire amount of the received power. Ibatt is positive when the battery 236 is being charged and negative when the battery 236 is being discharged. In some embodiments where the system power may need to be reduced for some reason, the PMIC 600 may send a signal to the main processor 562 to adjust, for example, processing power or screen brightness. In some embodiments, when the system components require more power than is available (i.e. $I_{sys}>I_{rx}$), they may draw the required current from the battery 236 by, e.g., discharging the battery 236 ($I_{sys}=I_{rx}-I_{batt}$, where $I_{batt}$ is negative).

In some embodiments, as shown in FIG. 6 and FIG. 5, the PMIC 600 may be an IC integrated into the receiver 208 of the PRU 406. In other embodiments, the PMIC 600 may be a standalone IC separated from the PRU 406 and configured to be coupled to, for example, the receiver 208 of the PRU 406. Furthermore, the controller 250 and PMIC 600 may be integrated into a standalone circuit. In other embodiments, the PMIC 600 may be integrated into one of the receiver 208, the controller 250 or the processor 562. Moreover, the PMIC 600 may be integrated into a power management module for battery charging. The PMIC 600 may also be integrated into a separate battery charger to be coupled to the PRU 406. In some embodiments, the PMIC 600 may include a first PMIC circuit and a second PMIC circuit (not shown). The first PMIC circuit may provide the received power to the system components. The second PMIC circuit may provide the remaining power to the battery 236. In other embodiments, instead of a single PMIC 600, two separate PMIC circuits (e.g., first and second PMIC circuits) may be used. In some embodiments, the PMIC 600 may be configured as a typical power management circuit that is used to charge a battery or power a load of the PRU 406. For example, the PMIC 600 may comprise a power management circuit PMM8920 available from Qualcomm Technologies, Inc. The PMIC 600 may or may not contain the controller 250, a power path manager (not shown), and a battery charger (not shown). In some embodiments, some or all of these four blocks (PMIC 600, the controller 250, the power path manager and the battery charger) may be integrated into one or more ICs. In other embodiments, the PMIC 600 as shown in FIG. 6 may be distributed or spread out into multiple chips (e.g., four separate ICs for power management and a $5^{th}$ IC for wireless charging).

In some embodiments, the controller 250 may detect the level of the received power based on the output DC power of the rectifier 234. In other embodiments, the controller 250 may receive, via the processor 562 or the bus 571, information regarding the level of the received power detected by the sensors 566 discussed above. As discussed above, the processor 562 may compare the detected power level with the threshold power level, and determine whether the received power is too high or too low for the current battery charging rate. In some embodiments, the controller 250 may also independently compare the detected power output of the rectifier 234 with the threshold power level, and determine whether the received power is too high or too low for the current battery charging rate. Furthermore, the controller 250 may receive, via the processor 562 or the bus 571, information regarding the type of the power supply 401 received by the transceiver 569 discussed above.

In some embodiments, when it is determined that the received power is too low for the present battery charging rate, the processor 562 may control the transceiver 569 to send a request to increase the present power level of the power supply 401 to a higher level. Furthermore, before sending the power level increase request to the PTU 402, the processor 562 or the controller 250 may adjust the magnitude of the battery charging current to match a desirable power level of the rectifier circuit 234. For example, if the received power is 5 W (5V×1 A) and the capacity of the battery 236 is 2000 mAh (or 2 ampHours), the processor 562 or the controller 250 may determine that the received power is too low for the current battery charging rate, and control the transceiver 569 to send a request to change the present power level (5 W) of the power supply 401 (e.g., QC 2.0 power supply) to a higher level (e.g., 18 W=9V×2 A). Before sending the power level increase request to the PTU 402, the processor 562 or the controller circuit 250 may control the PMIC 600 to increase the charging current of the battery 236. Since the power remains constant (i.e., 5 W) at this point (i.e., before receiving an adjusted power from the PTU 402), the increase in the battery charging current will subsequently lower the output voltage of the rectifier circuit 234 (P=IV). Thereafter, the processor 562 or the controller 250 may control the transceiver 569 to send the power level increase request to the PTU 402. The PRU 406 may subsequently receive an adjusted power having the higher level from the PTU 402. The rectifier 234 may generate a DC power output from the adjusted AC power. As the output voltage of the rectifier 234 has been already adjusted to accommodate a higher level of power (18 W), even if the higher level of power is received from the PTU 402, the rectifier 234 may stably operate without the need of an additional voltage regulator.

In some embodiments, as discussed above, when it is determined that the received power is too high for the current battery charging rate, the processor 562 may control the transceiver 569 to send a request to decrease the present power level of the power supply 401 to a lower power level. Furthermore, before sending the power level decrease request to the PTU 402, the processor 562 or the controller 250 may adjust the magnitude of the battery charging current to match a desirable power level of the load. For example, if the received power is 18 W (9V×2 A) and the capacity of the battery 236 is 1000 mAh (or 1 ampHours), the processor 562 or the controller 250 may determine that the received power is too high for the current charging rate, and control the transceiver 569 to send a request to decrease the present power level (18 W) of the power supply 401 (e.g., QC 2.0 power supply) to a lower level (e.g., 5 W=5V×1 A). Similarly, before sending the power level change request to the PTU 402, the processor 562 or the controller circuit 250 may control the PMIC 600 to decrease the charging current of the battery 236. Since the power remains constant (i.e., 18 W) at this point (i.e., before receiving an adjusted power from the PTU 402), the decrease in the battery charging current will subsequently higher the output voltage of the rectifier circuit 234 (P=IV). Thereafter, the processor 562 or the controller 250 may control the transceiver 569 to send the power level decrease request to the PTU 402. The PRU 406 may subsequently receive an adjusted power having the lower level from the PTU 402. The rectifier 234 may generate a DC power output from the adjusted AC power. Again, as the output voltage of the rectifier 234 has been already adjusted to accommodate a lower level of power (i.e., 5 W), even if the lower level of power is received from the PTU 402, the rectifier 234 may stably operate without the need of an additional voltage regulator.

In the above two scenarios, the processor 562 or the controller circuit 250 may determine the amount of the charging current to be increased or decreased based on the level of the received power, the power tolerance or operation range of the rectifier circuit 234, the current charging state of the battery 236 and/or the power requirement of the system components. For example, if the system components are drawing or require too much current from the PMIC 600, the controller 250 may control the PMIC 600 to decrease the battery charging current to an appropriate level. The appropriate charging current level to be reduced may include a negative battery current depending on the power requirement of the system components.

In some embodiments, in addition to or instead of adjusting the battery charging current, the controller 250 may control the PMIC 600 to decrease or increase current flowing to the system components (hereafter to be interchangeably used with "system current") of the PRU 406. For example, the system current can be reduced by forcing at least some of the system components to a certain state (e.g., an idle state where the brightness of a system display is reduced). The decrease and increase in the system current will also respectively increase and decrease the output voltage of the rectifier 234, similarly to adjustment in the battery charging current described above.

In some embodiments, when the power supply 401 is a multistage variable power supply such as a QC 3.0 power supply, the processor 562 or the controller circuit 250 may send the power level change request to the PTU 402, without adjusting the charging current of the battery 236. This is because the power adjustment in such a power supply is incremental (e.g., 200 mV) and the output voltage of the rectifier circuit 234 may not significantly vary based on the incremental power change. However, depending on the embodiment, the processor 562 or the controller circuit 250 may nevertheless control the PMIC 600 to adjust the charging current of the battery 236, before sending the power level change request to the PTU 402, even if the power supply 401 is a multistage variable power supply such as a QC 3.0 power supply.

A non-limiting benefit of the wireless power transfer system 500 is that the PRU 406 will not need a voltage regulator that regulates the voltage output of the rectifier circuit 234 to be substantially constant or stable. Since the rectifier 234 of the PRU 406 can stably operate without a separate voltage regulator, manufacturing costs can be reduced and system efficiency can improve.

Figure 7:
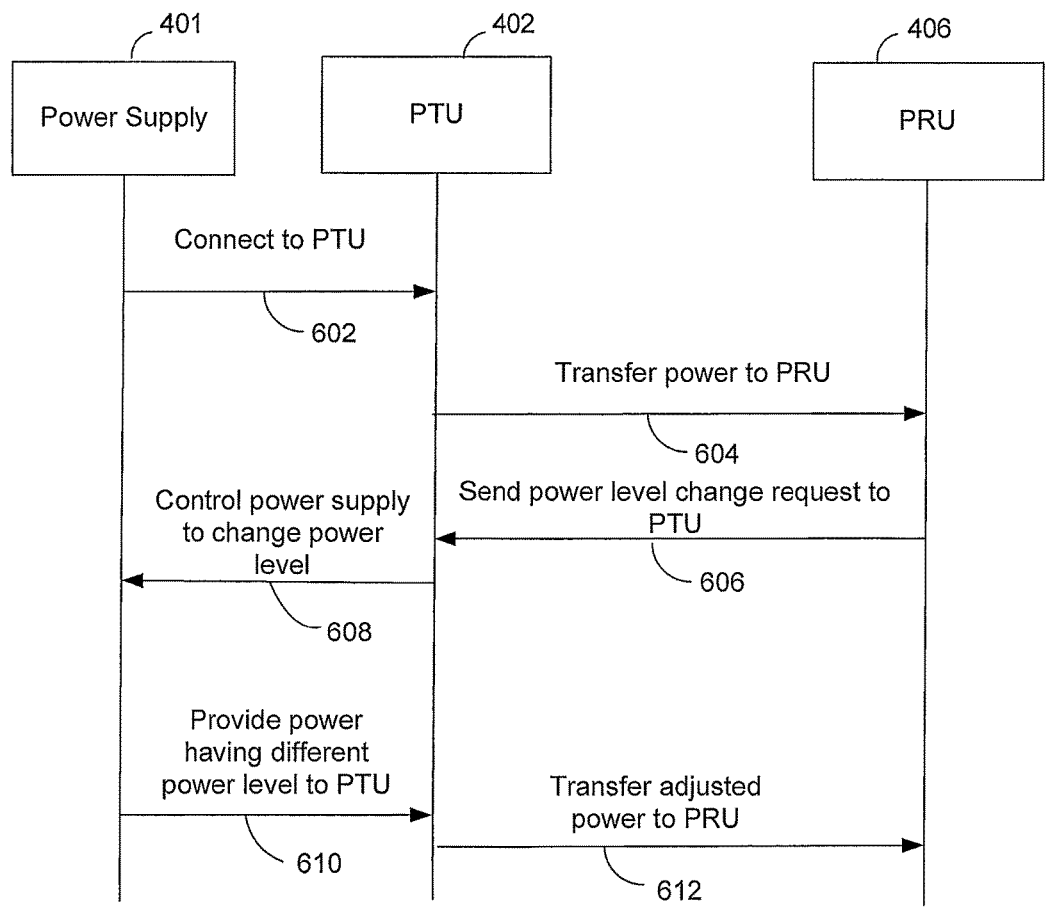
FIG. 7 is an exemplary flow diagram among a power supply, a power transmitting unit (PTU), and a power receiving unit (PRU).

FIG. 7 is an exemplary flow diagram among the power supply 401, the PTU 402, and the PRU 406. As shown in FIG. 7, the power supply 401 may connect to the PTU 402 (602). As discussed above, the connection between the PTU 402 and the power supply 401 may be wired or wireless. Furthermore, the PTU 402 may detect whether the power supply 401 is connected thereto. Once the connection between the power supply 401 and the PTU 402 is established, the power supply 401 provides power having a first power level to the PTU 402.

The PTU 402 may transfer the received power having the first power level to the PRU 406 via the wireless field 205 (604). In some embodiments, before transferring the power to the PRU 406, the PTU 402 may determine based on one or more of the sensors 526, whether the PRU 406 is placed close to or on the surface of the PTU 402. After determining that the PRU 406 has been placed close to or on the surface of the PTU 402, the PTU 402 may send information regarding the type of the power supply 401 to the PRU 406 via the separate communication channel 219. This power supply type information may be used for the PRU 406 to determine whether the battery charging current and/or the system current needs to be adjusted before sending a power change request to the PTU 402.

After receiving the power supply type information and the power having the first power level, the PRU 406 may determine whether the received power is too high or too low for the current battery charging rate and/or the power consumption rate of the system components. When the PRU 406 determines that the received power is too high or too low, the PRU 406 may send a request to change the first power level to a second power level different from the first power level via the wireless field 205 (606). In some embodiments, when the type of the power supply 401 is a multistage fixed power supply such as a QC 2.0 power supply and the PRU 406 determines that the received power is too high or too low, the PRU 406 may adjust the charging current of the battery 236 and/or the system current to match a desirable power level of the rectifier 234, before sending the power level change request to the PTU 402 as discussed above. In other embodiments, when the type of the power supply 401 is a multistage variable power supply such as a QC 3.0 power supply and the PRU 406 determines that the received power is too high or too low, the processor 562 or the controller 250 may determine whether to adjust the charging current of the battery 236 and/or the system current to match a desirable power level of the load, before sending the power level change request to the PTU 402.

In response to receiving the power level change request from the PRU 406, the PTU 402 may control the power supply 401 to change the present power level to the second power level (608). In some embodiments, when the power change request received from the PRU 406 indicates a specific amount of the second power level, the PTU 402 may control the power supply 401 to output power having the specific second power level to the PTU 402. In other embodiments, when the power change request merely includes a request to increase or decrease the first power level, the PTU 402 may determine an appropriate level of power to be adjusted and control the power supply 401 to output the appropriate second power to the PTU 402. After receiving the adjusted power from the power supply 401 (610), the PTU 402 may transfer the adjusted power to the PRU 406 via the wireless field 205 (612). Once the PRU 406 receives the adjusted power from the PTU 402, the PRU 406 may determine whether the adjusted power is too high or too low for the charging rate of the battery 236 and/or the power consumption rate of the system components. The procedures 606-612 may continue until the PRU 406 determines that the received power is neither too high nor too low.

Figure 8:
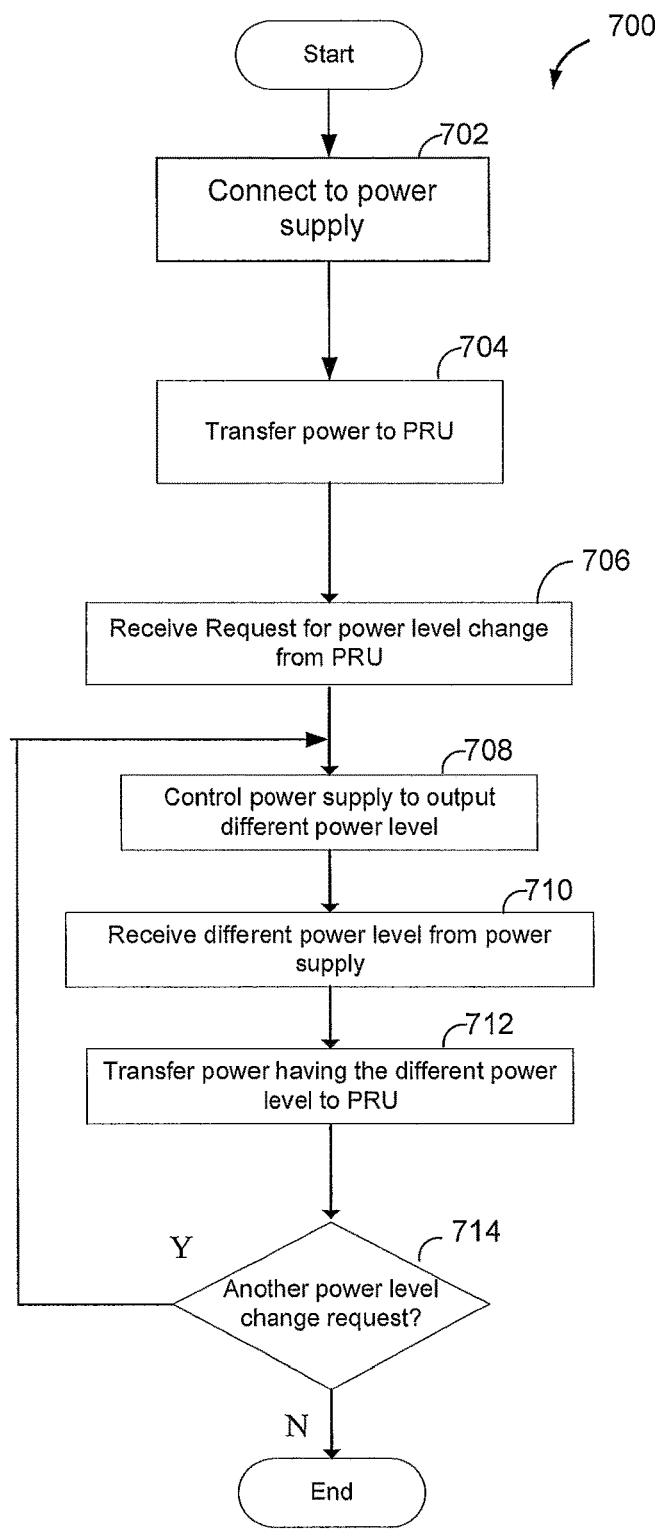
FIG. 8 is a flowchart of an exemplary method of transferring wireless power, in accordance with the disclosure herein.

FIG. 8 is a flowchart of an exemplary method 700 of transmitting wireless power, in accordance with one embodiment. The method 700 shown in FIG. 8 may be implemented via one or more devices including the transmitter 104, the power transmitting element 114, the power transmitting element 214, the transmit circuitry 350, and the PTU 402 of FIGS. 1-5. Although the method 700 is described herein with reference to a particular order, in various implementations, blocks herein may be performed in a different order, or omitted, and additional blocks may be added.

At block 702, the PTU 402 connects to the power supply 401. The PTU 402 may sense a type of the power supply, when the power supply 401 connects thereto. In some embodiments, the processor 522 may send to the PRU 406 information regarding a type of the power supply 401. The PTU 402 may receive power from the power supply 401. At block 704, the PTU 402 wirelessly transfers the received power to the PRU 406.

At block 706, the PTU 402 receives a request for a power level change from the PRU 406. At block 708, the PTU 402 requests the power supply 401 to output power having a different power level. When the power level change request indicates a specific power level, the PTU 402 may request the power supply 401 to output power having the specific power level. When the power level change request does not specify a power level to be adjusted, the PTU 402 may determine an appropriate power level and request the power supply 401 to output power having the appropriate power level.

At block 710, the PTU 402 receives power having a different power level from the power supply 401. At block 712, the PTU 402 wirelessly transfers to the PRU 406 the received power having the different power level. At block 714, the PTU 402 determines whether another request for a power level change has been received from the PRU 406. If the PTU 402 determines that another request for a power level change has been received from the PRU 406, the procedure goes back to block 708. If the PTU 402 determines that another request for a power level change has not been received from the PRU 406, the process ends and the PTU 402 may stop charging the PRU 406.

Figure 9:
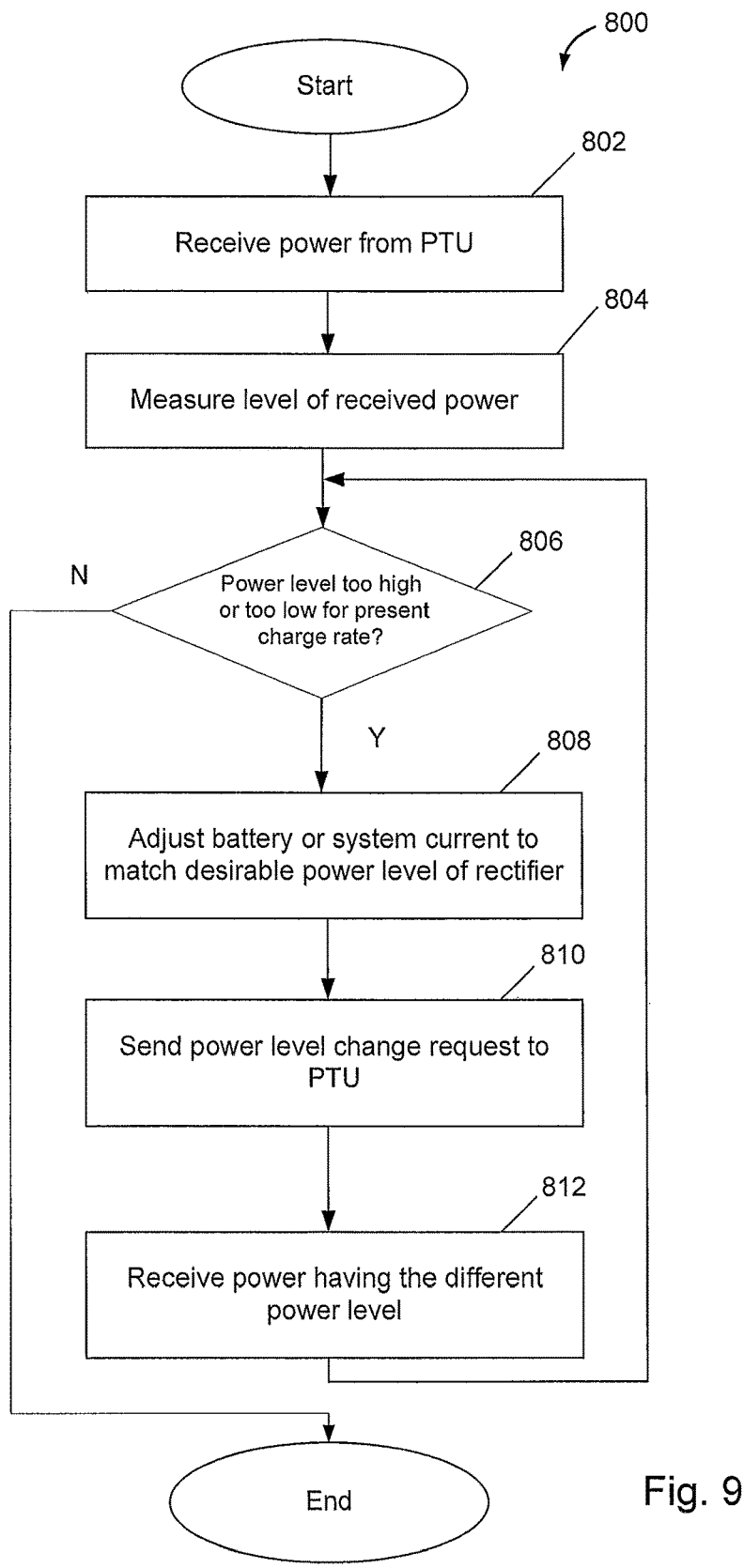
FIG. 9 is a flowchart of an exemplary method of receiving wireless power, in accordance with the disclosure herein.

FIG. 9 is a flowchart of an exemplary method 800 of receiving wireless power, in accordance with one embodiment. The method 800 shown in FIG. 9 may be implemented via one or more devices including the receiver 108, the power receiving element 118, the power receiving element 218, the receive circuitry 350, the PRU 406, and the receiver 208 of FIGS. 1-6. Although the method 800 is described herein with reference to a particular order, in various implementations, blocks herein may be performed in a different order, or omitted, and additional blocks may be added.

At block 802, the PRU 406 wirelessly receives power from the PTU 402 at a power level sufficient to charge or power a load. The PRU 406 may receive the power supply type information from the PTU 402. At block 804, the PRU 406 measures a power level of the received power. In some embodiments, the processor 562, the sensors 566, or the receiver 208 may measure the power level of the received power.

At block 806, the PRU 406 determines whether the level of the received power is too high or too low for a present charge rate or power consumption rate of the load. In some embodiments, the processor 562 or the controller 250 may determine whether the level of the received power is too high or too low for a present charging rate of the battery 236 and/or for a power consumption rate of the PRU system components.

If the processor 562 or the controller 250 determines that the level of the received power is too high or too low, the PRU 406 adjusts current flowing into the battery and/or the system components to match a desirable power level of the rectifier 234 (block 808). In some embodiments, if the processor 562 or the controller 250 determines that the level of the received power is not too high or not too low, the PRU 406 may determine whether the present charging rate can be increased. In these embodiments, the PRU 406 may send to the PTU 402 a request to change a present power level to a different power level without adjusting the battery or system current. In other embodiments, the PRU 406 may nevertheless adjust the battery or system current before sending to the PTU 402 the power level change request.

After the charging current and/or system component has been adjusted, the PRU 406 sends to the PTU 402 a request to change a present power level to a different power level (block 810). At block 812, the PRU receives power having the different power level. Thereafter, the process may go back to block 806.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present application is not intended to be limited to the embodiments shown herein but is to be accorded the widest scope consistent with the principles and novel features disclosed herein.

What is claimed is:

1. A wireless power receiver, comprising:
   a power receiver circuit configured to receive power from a wireless power transmitter at a level sufficient to power or charge a load; and
   a processor circuit configured to adjust a level of current being provided to the load based on a change in a level of received power to be requested to the wireless power transmitter, and send to the wireless power transmitter the request to change a present current level of the received power to a first different level.

2. The receiver of claim 1, wherein the processor circuit is further configured to compare the current level of the received power with a threshold power value and wherein the adjustment of the level of the current being provided to the load is further based on the comparison.

3. The receiver of claim 1, further comprising:
   a power measurement circuit configured to measure the current level of the received power and provide the measured power level to the processor circuit; and
   a communication circuit configured to send to the wireless power transmitter the request to change the current level of the received power to the first different level under the control of the processor circuit.

4. The receiver of claim 1, wherein the request to change the current level of the received power comprises a request to increase or decrease the current level of the received power without indicating a power level to be adjusted.

5. The receiver of claim 1, wherein the power receiver circuit comprises:
   a rectifier circuit configured to rectify the received power and output a direct current (DC) power; and
   a power management integrated circuit (PMIC) configured to receive the DC power and provide the received DC power to the load.

6. The receiver of claim 5, wherein the load comprises a battery connected to a battery charger and at least one system component, and wherein the processor circuit is further configured to control the PMIC to adjust an amount of the current flowing into the battery charger and/or the system component to adjust an output voltage of the rectifier circuit.

7. The receiver of claim 6, wherein the processor circuit is further configured to control the PMIC to adjust an amount of the current flowing into the battery charger based at least in part on a power requirement of the system component to adjust an output voltage of the rectifier circuit.

8. The receiver of claim 7, wherein the processor circuit is further configured to control the PMIC to discharge the battery, when the amount of power required by the system component is greater than an entire amount of the received power received from the wireless power transmitter.

9. The receiver of claim 6, wherein the processor circuit is further configured to control the PMIC to adjust the level of the current flowing only into the battery charger to adjust an output voltage of the rectifier circuit.

10. The receiver of claim 6, wherein the processor circuit is further configured to control the PMIC based at least in part on the level of the received power, an operation range of the rectifier circuit, a charging state of the battery and/or a power requirement of the system component.

11. The receiver of claim 5, wherein the rectifier circuit has an operation range, and wherein the threshold power value comprises a power value selected from the operation range of the rectifier circuit.

12. The receiver of claim 1, wherein the processor circuit is configured to receive information from the wireless power transmitter regarding a type of a power supply that supplies the power to the wireless power transmitter.

13. The receiver of claim 1, wherein the power receiver circuit is further configured to receive power having the first different level from the wireless power transmitter, and wherein the processor circuit is further configured to compare the first different level with the threshold power value, adjust an amount of the current being provided to the load based at least in part on the comparison, and send to the wireless power transmitter a request to change the first different level to a second different level.

14. A method of receiving wireless power, comprising:
   wirelessly receiving power from a transmitter at a level sufficient to power or charge a load;
   providing the received power to the load;
   comparing the level of the received power with a threshold power value;
   adjusting a level of current being provided to the load based at least in part on the comparison; and
   sending to the transmitter a request to change the level of the received power to a different power level subsequent to the adjusting the level of the current.

15. The method of claim 14, wherein the sending comprises sending a request to increase or decrease a level of the received power without indicating a power level to be adjusted.

16. The method of claim 14, further comprising:
rectifying, at a rectifier circuit, the received power and output a direct current (DC) power; and
providing the DC power to the load.

17. The method of claim 16, wherein the load comprises a battery connected to a battery charger and at least one system component, and wherein the adjusting comprises adjusting an amount of the current to adjust an output voltage of the rectifier circuit.

18. The method of claim 17, wherein the adjusting comprises discharging the battery, when the amount of power required by the system component is greater than an entire amount of the received power from the transmitter.

19. A system for receiving wireless power, comprising:
means for wirelessly receiving power from a transmitter at a level sufficient to power or charge a load;
means for providing the received power to the load;
means for comparing the level of the received power with a threshold power value;
means for adjusting the level of current being provided to the load based at least in part on the comparison; and
means for sending to the transmitter a request to change the level of the received power to a different power level subsequent to adjusting the level of the current.

20. The system of claim 19, wherein the wirelessly receiving means and the means comprise a power receiver circuit, wherein the comparing means and the adjusting means comprise a processor circuit, and wherein the sending means comprises a communication circuit.

21. The system of claim 19, wherein the sending means comprises means for sending a request to increase or decrease the level of the received power without indicating a power level to be adjusted.

22. The system of claim 19, further comprising:
means for rectifying the received power and outputting a direct current (DC) power; and
means for providing the DC power to the load.

23. The system of claim 22, wherein the load comprises a battery connected to a battery charger and at least one system component, and wherein the adjusting the level of the current adjusts an output voltage of the rectifying means.

24. The system of claim 23, wherein the adjusting means comprises means for discharging the battery, when the amount of power required by the system component is greater than an entire amount of the received power.

* * * * *